United States Patent [19]
Shibuya

[11] Patent Number: 5,633,749
[45] Date of Patent: May 27, 1997

[54] OPTICAL FIBER AMPLIFIER HAVING LIGHT SURGE PREVENTING FUNCTION

[75] Inventor: Takashi Shibuya, Tokyo, Japan

[73] Assignee: NEC Corporation, Tokyo, Japan

[21] Appl. No.: 640,993

[22] Filed: Apr. 30, 1996

[30] Foreign Application Priority Data

May 12, 1995 [JP] Japan .................................... 7-114401

[51] Int. Cl.$^6$ ........................................................ H01S 3/00
[52] U.S. Cl. ............................................. 359/341; 359/177
[58] Field of Search ................................... 359/341, 177

[56] References Cited

U.S. PATENT DOCUMENTS

| | | | |
|---|---|---|---|
| 5,245,690 | 9/1993 | Aida et al. | 385/142 |
| 5,268,786 | 12/1993 | Matsushita et al. | 359/341 |
| 5,374,973 | 12/1994 | Maxham et al. | 359/341 |
| 5,467,219 | 11/1995 | Ushirozawa | 359/341 |
| 5,471,334 | 11/1995 | Masuda et al. | 359/177 |
| 5,506,724 | 4/1996 | Shimizu et al. | 359/341 |
| 5,539,570 | 7/1996 | Ushirozawa | 359/341 |

OTHER PUBLICATIONS

Ishio et al.; "Light Amplifiers and Their Applications"; Ohm sha, 1992, p. 111.

*Primary Examiner*—Mark Hellner
*Attorney, Agent, or Firm*—Whitham, Curtis, Whitham & McGinn

[57] ABSTRACT

At a post stage of an amplifying optical fiber, such a means is provided that detects a level of light having a center wavelength of the amplified signal light, and also a level of light having a wavelength different from that of this center wavelength, and further another means is provided which compares the level of the light having these wavelengths, and controls an output of a pumping light source based on this comparison result. To detect the intensity of the light having these two wavelengths, two light branching devices, and light receiving devices are arranged via the respective light band-pass filters for passing therethrough the light having the above-described wavelengths at the post stage of the amplifying optical fiber. When the light intensity ratio of both the light having the wavelengths is larger than a preset value, the output of the pumping light source is maintained. Conversely, when this light intensity ratio is smaller than this preset value, the output of the pumping light source is interrupted by assuming that the input signal light is interrupted. The adverse influences caused by the light surge can be avoided without increasing the noise figure.

16 Claims, 5 Drawing Sheets

OPTICAL FIBER AMPLIFIER HAVING LIGHT SURGE PREVENTING FUNCTION

BACKGROUND OF THE INVENTION

1. Field of the Invention

The present invention relates to an optical fiber amplifier. More specifically, the present invention pertains to an optical fiber amplifier having a light surge preventing function capable of preventing light surge, while when light output power of input signal light is decreased, light output power of pumping light derived from a pumping light source and entered into an amplifying optical fiber is suppressed.

2. Description of the Related Art

One conventional optical fiber amplifier is arranged by an optical fiber for amplifying signal light, a pumping light source for outputting pumping light, and a light multiplexing device for inputting the pumping light to the optical fiber. Furthermore, in the conventional optical fiber amplifier, a light branching device and a light receiving device are arranged at the post stage of the optical fiber, and these light branching device and light receiving device monitor the amplified signal light. A light output level of the amplified signal light is detected by this light receiving device so as to control the pumping light output from the pumping light source. Normally, optical isolators, or optoelectronic isolators are arranged before/after the optical fiber along the signal light path in order to avoid adverse influences such as reflection light.

The signal light externally entered into the optical fiber is amplified by the wavelength-multiplexer based on the pumping light entered into this optical fiber, and then the amplified signal light is outputted outside from the wavelength-multiplexer. The above-explained arrangement of the conventional optical fiber amplifier and the basic operation thereof are described in, for instance, Japanese book "LIGHT AMPLIFIERS AND THEIR APPLICATIONS" written by Ishio et al., published by Ohm sha, 1992, page 111.

As the amplifying optical fiber used in the above-described optical fiber amplifier, the rare earth doped optical fiber into which the rare earth element has been doped is employed.

However, in the optical fiber amplifier with employment of such a rare earth doped optical fiber having the function to amplify the input light thereof, in which the rare earth element has been doped into the optical fiber, the lower the level of the entered signal light becomes, the higher the inverted population becomes. As a consequence, very large energy is stored under such a state that no external signal is inputted. Accordingly, when the signal light is suddenly inputted from such a condition that no signal light is entered into the optical fiber amplifier with employment of the rare earth doped optical fiber, the induced emission will occur due to the stored large energy, the light surge with the high power will be produced since this induced emission occurs until the inverted population could reach the balance condition. Then, this high power light surge is outputted from the optical fiber amplifier. Since the light surge is produced in the rare earth doped optical fiber, this light surge would give the adverse influences to the optical components arranged at the post stage of this optical fiber.

SUMMARY OF THE INVENTION

An object of the present invention is to provide an optical fiber amplifier having a light surge preventing function, capable of avoiding an adverse influence caused by light surge without increasing a noise figure which may cause problems in the conventional optical fiber amplifier.

In the optical fiber amplifier having the light surge preventing function according to the present invention, light receiving devices are provided at a post stage of an amplifying optical fiber, and these light receiving devices detect a level of amplified signal light having a wavelength, and another level of light having a wavelength different from this wavelength. The light receivers perform a comparison process to the light having these waveforms, and a control circuit for controlling the output of the pumping light source based upon this comparison result is provided.

Concretely speaking, the optical fiber amplifier having the light surge preventing function, according to the present invention, is comprised of a pumping light source for outputting pumping light, a wavelength-multiplexer for multiplexing this pumping light with signal light, and an optical fiber connected to this light synthesizing device, for amplifying the signal light to output the amplified signal light. Furthermore, this optical fiber amplifier is constructed of a first light branching device for branching the amplified signal light to output first branched/amplified signal light and second branched/amplified signal light, and for branching the second branched/amplified signal light to output third branched/amplified signal light and fourth branched/amplified signal light.

In these light branching devices, there are provided a first light band-pass filter for passing the light having the center wavelength of the amplified signal light; another light band-pass filter for passing light having a wavelength adjacent to this central wavelength; a first light receiving device for receiving light having a first preselected wavelength of the second branched/amplified signal light to detect first light intensity; and a second light receiving device for receiving light having a second preselected wavelength of the third branched/amplified signal light to detect second light intensity. Furthermore, these light branching devices are comprised of a comparator for comparing the first light intensity with the second light intensity to thereby output a ratio of the light intensity; and a pumping light control circuit for controlling the pumping light in response to a difference between the first light intensity and the second light intensity.

In the above-described arrangement, it is provided with a pumping light control circuit for controlling the pumping light supplied to the optical fiber. The pumping light control circuit controls the pumping light source so as to output the pumping light to the optical fiber when the light intensity ratio is higher than a preset reference value, and on the other hand, so as to interrupt the supply of the pumping light to the optical fiber when the light intensity ratio is lower than a preselected reference value. To interrupt the supply of this pumping light, it is provided with a pumping light output circuit for causing the pumping light source to output the pumping light when the light intensity ratio is higher than the reference value, and for causing the pumping light source to stop the output of the pumping light from the pumping light source when the light intensity ratio is lower than the reference value.

Also, in the optical fiber amplifier having the light surge preventing function according to the present invention, a semiconductor laser diode is employed in the pumping light source, the pumping light section includes an injection current control circuit for supplying the injection current to the pumping light source when the light intensity ratio is higher than the reference value, and for interrupting the supply of the injection current into the pumping light source when the light intensity ratio is lower than the reference value.

In the optical fiber amplifier having the light surge preventing function according to the present invention, light receiving devices are arranged on an output side of a rare earth doped light fiber, and then a light output of amplified signal light having a wavelength of "λ1" and a light output of amplified signal light having a wavelength of "λ2" are monitored by these light receivers. A light intensity ratio of the light having these wavelengths is calculated, and then the pumping light is controlled based upon this calculated result. As a consequence, since it is not required to additionally arrange the optical component at the prestage of the rare earth doped optical fiber, there is no risk to induce the loss of the input signal light. It is also possible to prevent the occurrence of light surge under no signal condition without increasing the noise figure.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Figure 1:
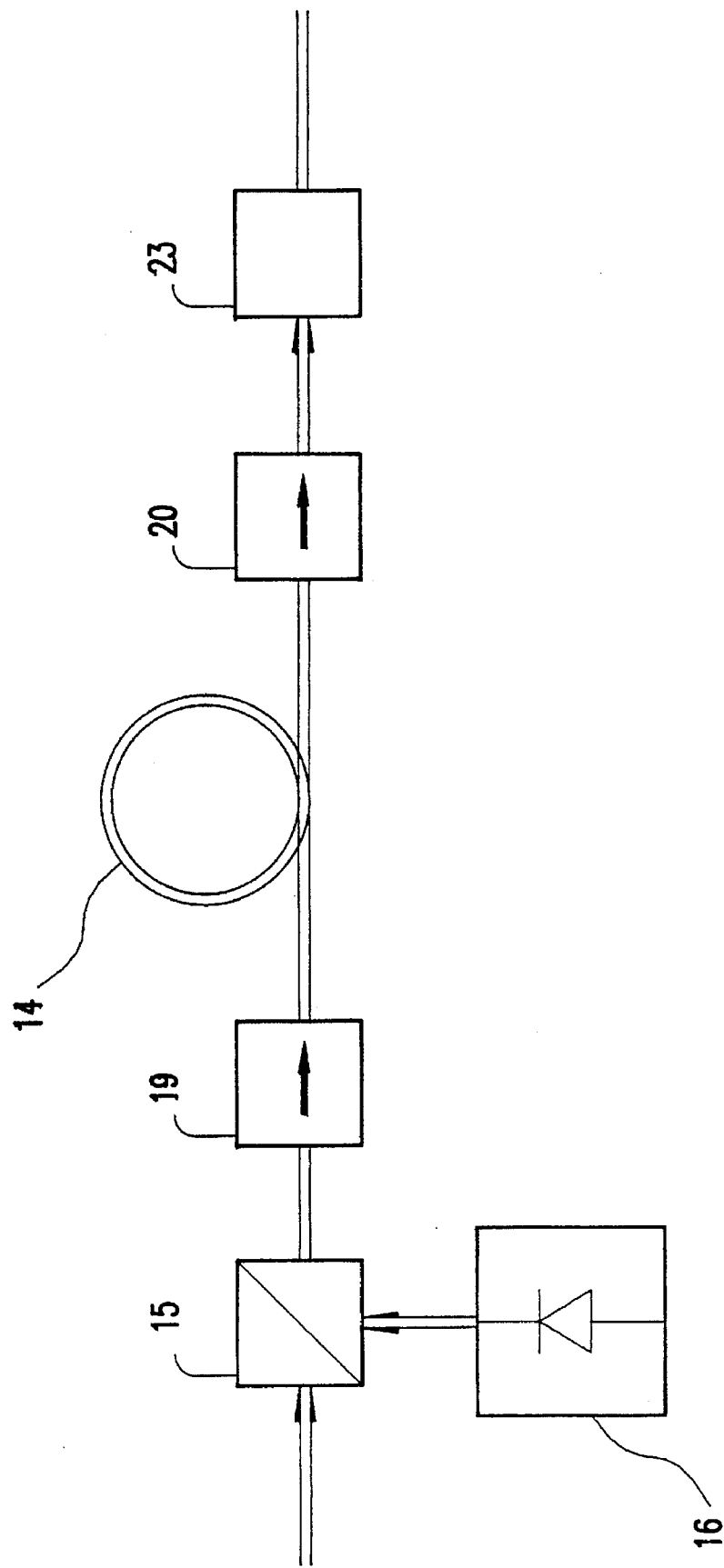
FIG. 1 schematically shows a basic arrangement of an optical fiber amplifier having a light surge preventing function.

Before describing an arrangement of an optical fiber amplifier according to the present invention, the arrangement of the conventional optical fiber amplifier will be first explained in order to easily understand the present invention. FIG. 1 is a schematic diagram for showing a basic arrangement of one conventional optical fiber amplifier. Referring now to FIG. 1, the arrangement of this conventional generic optical fiber amplifier will be described.

A pumping LD module 16 used to input pumping light to a rare earth doped optical fiber 14 is connected to a prestage of this rare earth doped optical fiber 14 by a wavelength-multiplexer 15. In this drawing, signal light (not shown in detail) inputted leftwardly is multiplexed with the pumping light by the wavelength-multiplexer 15. The signal light multiplexed with the pumping light is inputted into the rare earth doped optical fiber 14 to be amplified, and the amplified light is outputted rightwardly. A polarization independent optical (optoelectronic) isolator 19 and another polarization independent optical isolator 20 are arranged before/after the rare earth doped optical fiber 14 along the light signal path, and these optical isolators 19 and 20 are employed so as to prevent the light from being propagated along the reverse light propagation direction. It should be noted that a light band-pass filter 23 through which such light having a specific wavelength can pass is arranged on the output side.

In the arrangement of the optical fiber amplifier shown in FIG. 1, when the above-described light surge happens to occur in the rare earth doped optical fiber 14, this light surge is inputted into the optical isolator 20 and the light band-pass filter 23, which are positioned at the post stage of this rare earth doped optical fiber 14. Normally, since the light surge corresponds to such light surge having a level of several wattage, the functions of these optical components would be deteriorated in such a manner that the optical elements arranged therein are damaged.

Figure 2:
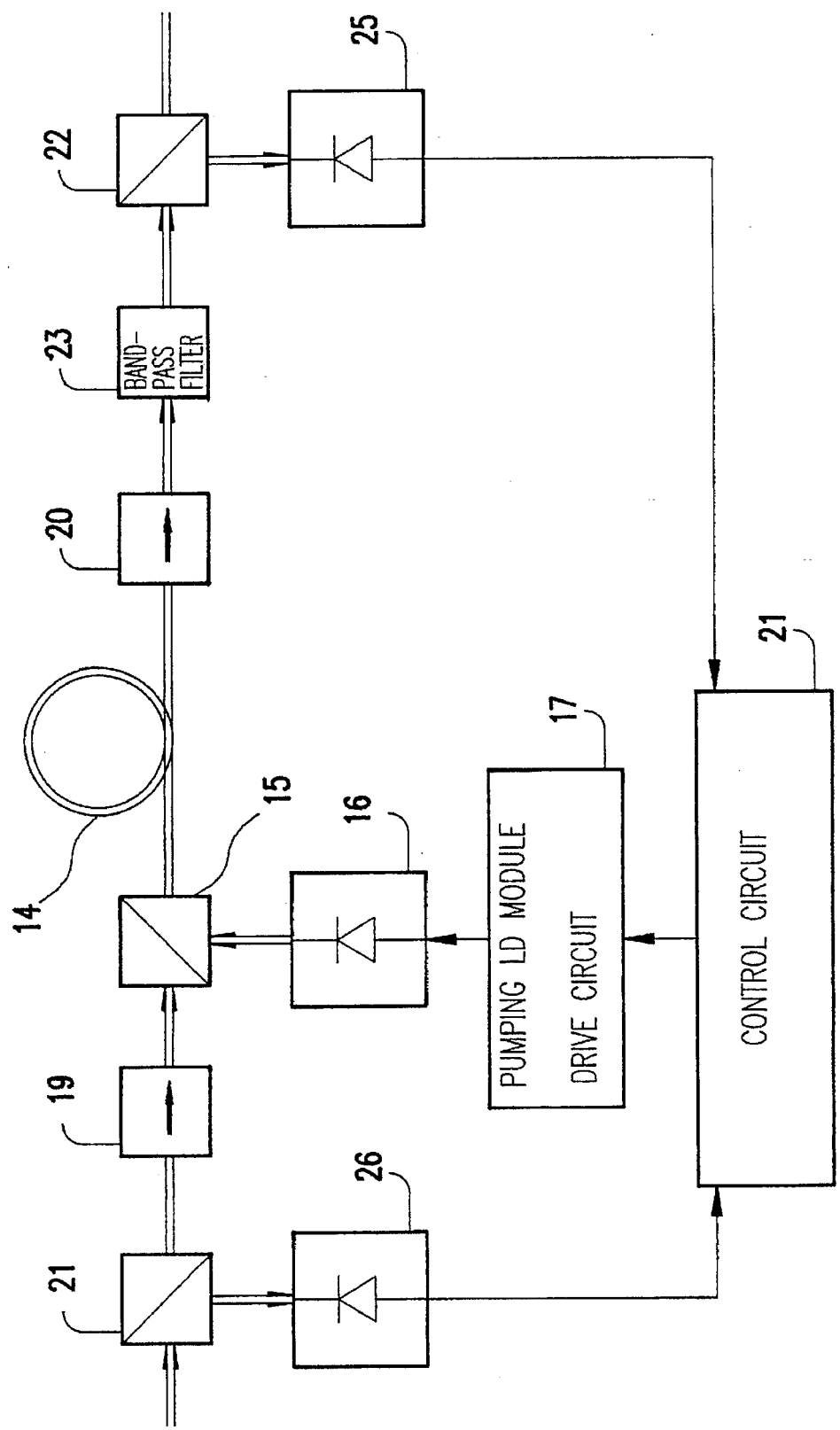
FIG. 2 schematically represents the arrangement of the conventional optical fiber amplifier having the light surge preventing function.

As the conventional optical fiber amplifier having the function to prevent the light surge, there is the above-described avoiding means for limiting the transmission rising time. As another avoiding means, an arrangement indicated in FIG. 2 is known. In this arrangement of FIG. 2, there is provided the function to monitor the input signal light. When the input signal light is interrupted, the occurrence of light surge is avoided by turning OFF the pumping light source 16.

That is, a light branching device 21 and a light receiving device 26, which monitor a portion of the input signal light, are arranged at an input unit of a rare earth doped fiber amplifier 34. When the input signal light is interrupted, namely the input signal condition is changed into no signal condition, the level of the input light monitored by the light receiving device 26 is lowered. The lowered light level is processed by a control circuit 27, and a drive circuit 17 for driving the pumping light source 16 is controlled in such a manner that the pumping light power of the pumping light source 16 is reduced. Conversely, when the input signal light is recovered, this level change is sensed by the light receiving device 26. Based upon this sensing result, the pumping light power is recovered to the original power condition. As described above, the power condition of the pumping light is controlled by monitoring the conditions of the signal light by the light receiving device arranged at the prestage of the rare earth doped optical fiber in order to avoid the adverse influences caused by the light surge in the prior art.

However, in such a conventional optical fiber amplifier that the light branching device is arranged at the prestage of the rare earth doped optical fiber so as to monitor the signal light, it is not avoidable that the passing loss caused by the optical components would occur in the signal light before being amplified. There is a problem that since the noise figure of the optical fiber amplifier is adversely influenced by this passing loss, the characteristic of this optical fiber amplifier would be deteriorated.

Figure 3:
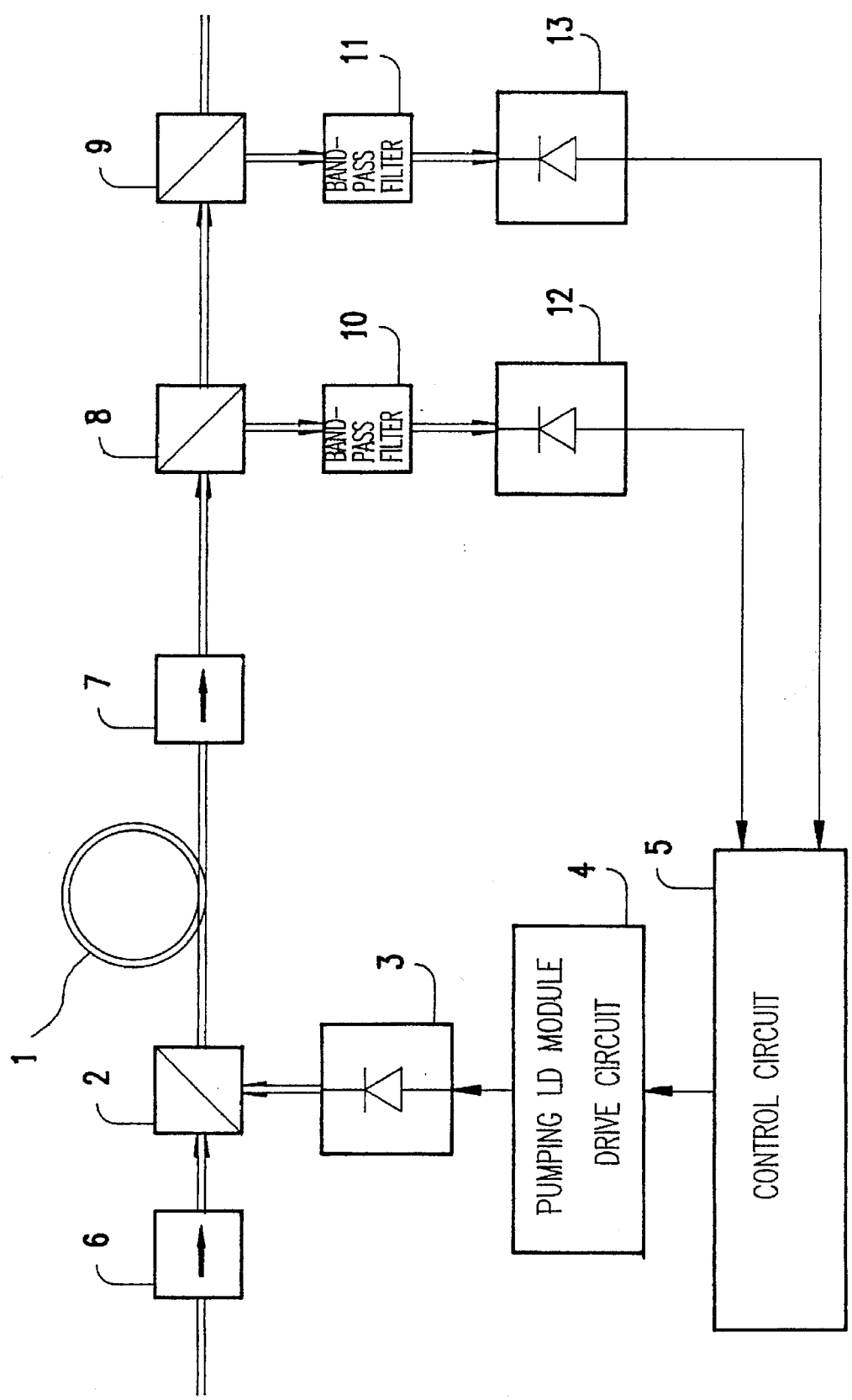
FIG. 3 schematically illustrates a basic arrangement of an optical fiber amplifier having a light surge preventing function according to the present invention.

FIG. 3 is a schematic diagram for showing a basic arrangement of an optical fiber amplifier having a light surge preventing function, according to the present invention. First, a description will now be made of the basic arrangement and the operation principle of the optical fiber amplifier according to the present invention.

The optical fiber amplifier, according to the present invention, is constructed of a rare earth doped optical fiber 1, a wavelength-multiplexer 2, a pumping light source 3, a drive circuit 4 for driving the pumping light source 3, a control circuit 5, polarization independent optical isolators 6 and 7, light branching (separating) devices 8 and 9, light band-pass filters 10 and 11, and light receiving devices 12 and 13. Since the structures and the functions of the above-described optical components other than the light branching devices 8 and 9, the light band-pass filters 10 and 11, and the light receiving devices 12 and 13 are similar to those of the conventional optical fiber amplifier, explanations thereof are omitted.

The optical fiber amplifier indicated in FIG. 3 is so designed as to amplify signal light having a wavelength of "$\lambda 1$". The light band-pass filters 10 and 11 are light filters for selectively passing therethrough the light having the wavelength of "$\lambda 1$" and the light having the wavelength of "$\lambda 2$", respectively. In this case, as the wavelength "$\lambda 2$", such a wavelength near the wavelength "$\lambda 1$" is selected. On the other hand, the light band-pass filter 11 has the narrow wavelength band characteristic to cut off the light having the wavelength "$\lambda 1$".

When the signal light with the wavelength of "$\lambda 1$" is inputted under such a condition that the pumping light source 3 is driven and is capable of amplifying the input light, the amplified signal light with the wavelength of "$\lambda 1$" is outputted from the rare earth doped optical fiber 1 together with amplified spontaneous emission.

Figure 4A:
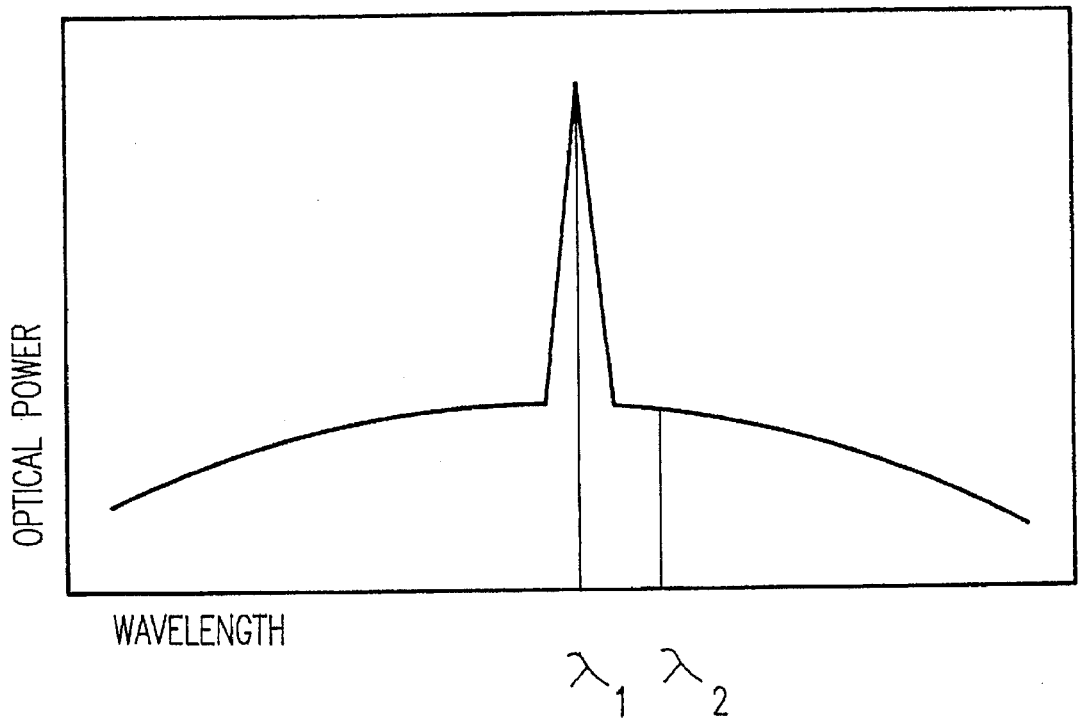
FIGS. 4(a) and 4(b) graphically show an optical power/wavelength characteristic of a rare earth doped optical fiber employed in the optical fiber amplifier having the light surge preventing function according to the present invention.

In FIG. 4a, a light power/waveform characteristic of light outputted from the rare earth doped optical fiber 1 is represented. A portion of the amplified signal light having the wavelength of "$\lambda 1$" is branched by the light branching device 8, and the branched light passes through the light band-pass filter 10 and then is received by the light receiving device 12. A portion of the signal light branched by the light branching device 9 is interrupted by the light band-pass filter 11, and a portion of amplified spontaneous emission selectively passes through this light band-pass filter 11 and thereafter is received by the light receiving device 13.

In the case that the losses of the light having the wavelengths passed through the light band-pass filters 10 and 11 are substantially equal to the light receiving sensitivities of the light receiving devices 12 and 13, a ratio of the output power of the light having the two different wavelengths "$\lambda 1$" and "$\lambda 2$" outputted from the rare earth doped optical fiber 1 is directly equal to a ratio of intensity of the light received by the light receiving devices 12 and 13, as shown in FIG. 4a.

Figure 4B:
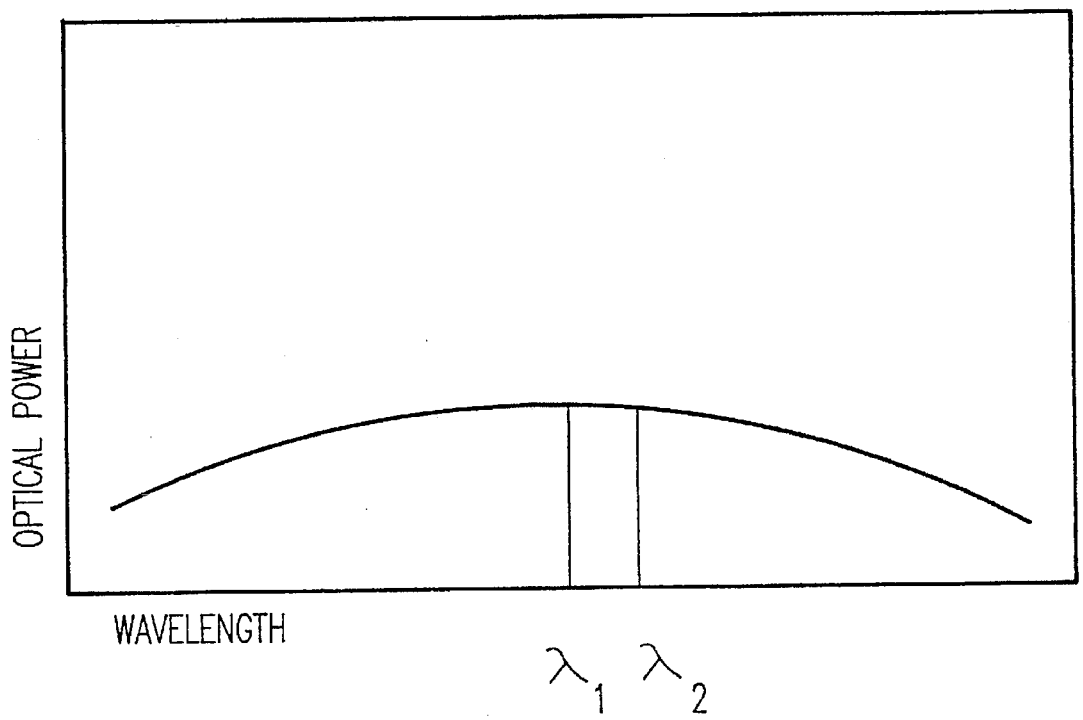

To the contrary, when the output of the input signal light having the wavelength "$\lambda 1$" is extremely lowered and the operation condition is brought into the no signal condition, the amplified amount of the light having the wavelength of "$\lambda 1$" is lowered. As a result, the power level of the amplified spontaneous emission is relatively increased, and the optical output contains substantially only the amplified spontaneous emission. A light power/wavelength characteristic distribution of the rare earth doped optical fiber 1 at this time is indicated in FIG. 4(b). Under this condition, the light power levels detected by the light receiving devices 12 and 13 are substantially equal to each other.

As described above, in response to the input level changes in the input light signal having the wavelength of "$\lambda 1$", the light intensity ratio of the wavelength "$\lambda 1$" to the wavelength "$\lambda 2$" received by the light receiving devices 12 and 13 is varied. Under no signal condition, this light intensity ratio is greatly changed. As a result, the occurrence of the light surge can be suppressed by employing such a method that when the light intensity ratio of the wavelength $\lambda 1$ to the wavelength $\lambda 2$ detected by the light receiving devices 12 and 13 becomes lower than a preset reference value, the input signal light is not amplified.

Concretely speaking, the light intensity ratio of the wavelength $\lambda 1$ to the wavelength $\lambda 2$ detected by the respective light receiving devices 12 and 13 is compared with the reference value calculated by the control circuit 5. In the case that this light intensity ratio is smaller than this value, a control signal is sent to the drive circuit 4 so as to control an injection current supplied to the pumping LD module 3, so that the power of the pumping light is either lowered or completely stopped. In accordance with the above-described operations, the change in the signal light can be detected by the light branching device and the like arranged only at the post stage of the rare earth doped optical fiber 1. As a consequence, it is possible to avoid the light surge without increasing the noise figure, contrary to the conventional optical fiber amplifier.

Figure 5:
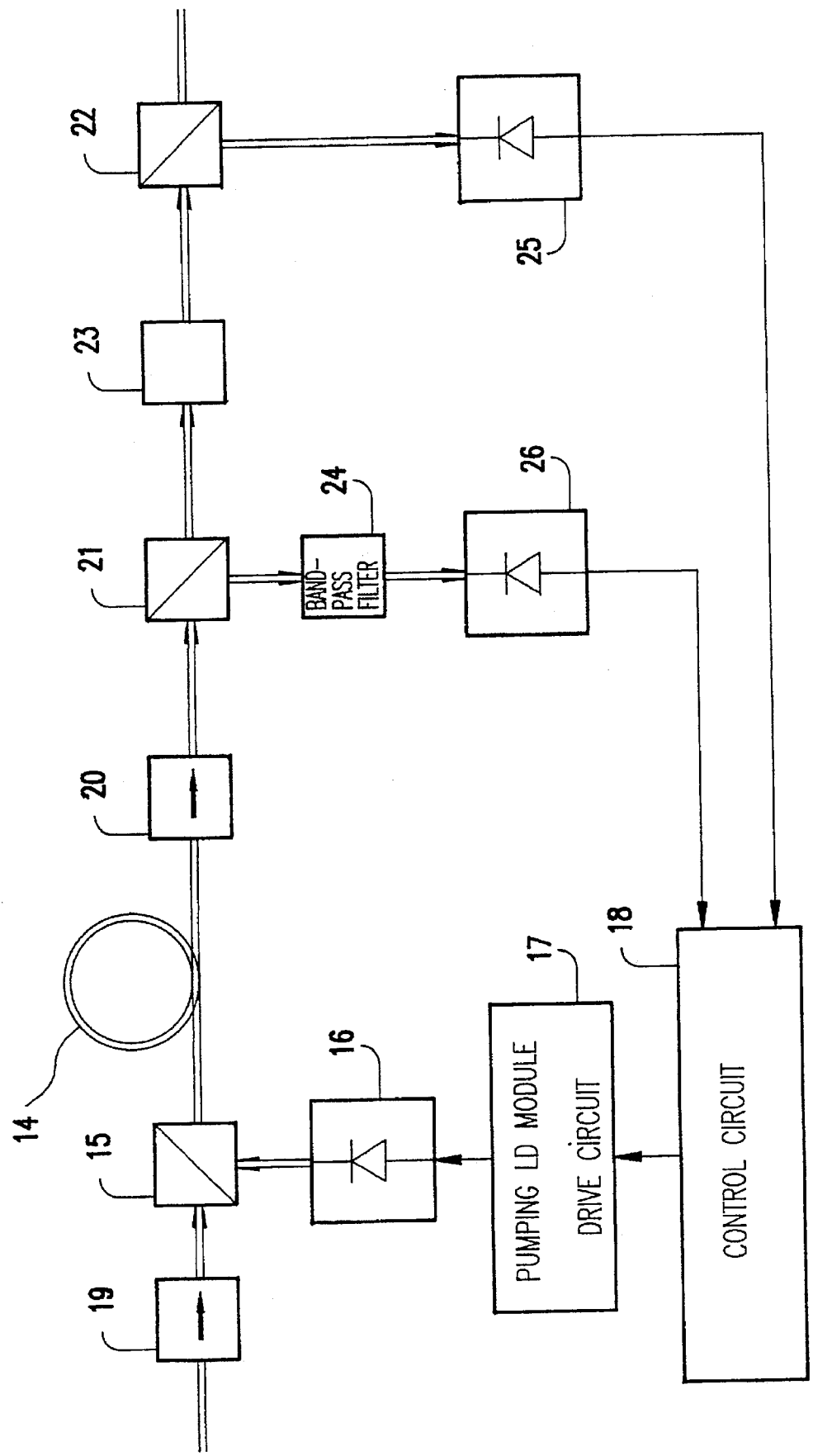
FIG. 5 schematically indicates an optical fiber amplifier having a light surge preventing function according to an embodiment of the present invention.

Referring now to FIG. 5, a concrete arrangement of an optical fiber amplifier having a light surge preventing function according to the present invention will be explained. FIG. 5 is a structural diagram for representing an optical fiber amplifier having a light surge preventing function according to an embodiment of the present invention.

The optical fiber amplifier having the light surge preventing function, according to this embodiment, is comprised of an erbium doped fiber 14, a wavelength-multiplexer 15, a pumping LD module 16, a drive circuit 17 for driving the pumping LD module 16, a control circuit 18, polarization independent optical isolators 19 and 20, light branching devices 21 and 22, light band-pass filters 23 and 24, and light receiving devices 25 and 26. Since the wavelength of the signal light is selected to be 1,550 nm in this embodiment, an erbium doped fiber is employed which is suitable for the rare earth doped optical fiber capable of amplifying the light having this wavelength.

Also, since light having a wavelength of 1,480 nm is used as the pumping light, as the wavelength-multiplexer 15, such a light multiplexing device is employed which multiplexes 1,550 nm corresponding to the wavelength of the input signal light with 1,480 nm corresponding to the wavelength of the pumping light. To reduce losses of the wavelength-multiplexer 15 and the light branching devices 21 and 22, fiber fused type optical components are utilized. A light branching device having a branching ratio of 10 dB is employed as the light branching devices 21 and 22. Approximately 10% of the amplified light is branched by the light branching devices 21 and 22 for monitor purposes.

As the light band-pass filters 23 and 24, such light filters are used whose transmission central wavelengths are 1,550 nm and 1,560 nm, respectively. Also, the half band widths of the transmission wavelengths of these light filters are selected to be 2 nm. The light band-pass filter 23 passes the amplified signal light therethrough and blocks the amplified spontaneous emission. On the other hand, the light band-pass filter 24 passes therethrough the amplified spontaneous emission whose wavelength is approximated to that of the amplified signal light. According to this embodiment, the light band-pass filter 23 is arranged between the light branching devices 21 and 22 in order to detect only the light intensity of the amplified light. Alternatively, this light band-pass filter 23 may be arranged between the light branching devices 22 and 25.

As the polarization independent optical isolators 19 and 20, such optical isolators are used whose transmission loss at the wavelength of 1,550 nm, is 1 dB, and whose isolation is 45 dB. As the light multiplexing device 15, such a wavelength-multiplexer is employed whose signal light path loss is 0.5 dB at the central wavelength, and whose pumping light path loss is 0.5 dB at the wavelength of 1,470 nm.

As the pumping LD module 16, such a pumping LD module is utilized which owns a characteristic such that light power is 50 mW at maximum and an oscillating central wavelength is 1,470 nm under such a condition that the ambient temperature of the laser diode is 25° C.

Subsequently, the characteristics of the above-explained optical fiber amplifier having the light surge preventing function, especially the noise figure thereof, according to this embodiment of the present invention will now be explained based upon experimental results.

The optical fiber amplifier according to one embodiment of the present invention has such a performance capable of amplifying signal light with −20 dB having a wavelength of 1,550 nm up to +0 dBm. In the actual operation, the light power of the pumping LD module 16 is 35 mW, and the light power of the pumping light to the erbium doped fiber 14 is 31 mW. At this time, the noise figure of the erbium doped fiber 14 itself is 4.8 dB, whereas the noise figure of this optical fiber amplifier having the light surge preventing function is 6.3 dB.

In the case that the light power of the input signal light having the wavelength of 1,550 nm is −20 dBm, the light receiving currents of the light receiving devices 25 and 26 are 80 μA and 100 nA, respectively. On the other hand, in the case that the light power of the input signal light having the wavelength of 1,550 nm is −60 dBm, the light receiving currents of the light receiving devices 25 and 26 are 1 μA and 50 nA, respectively. In accordance with this embodiment, the control circuit is set in such a manner that when the ratio of the light receiving current of the light receiving device 25 to that of the light receiving device 26 is lower than, or equal to 10 times, the pumping LD module drive circuit 17 is controlled, and also the drive circuit of the pumping LD module 16 is lower than, or equal to several tens of mA.

In the optical fiber amplifier, even when the signal light input condition is changed into the no signal condition, the two light outputs having the different wavelengths from each other can be detected. Based on the intensity ratio of the detected light, the pumping light power of the pumping LD module 16 is controlled based on the control circuit 18. In this embodiment, it could be confirmed that the occurrence of the light surge is prevented.

On the other hand, as apparent from the arrangement of the optical fiber amplifier having the light surge preventing function according to the present invention, only the light synthesizing device (wavelength-multiplexer) 15 for entering the pumping light is arranged at the prestage of the erbium doped fiber 14. As a result, as previously explained, the noise figure is not increased.

It should be noted that according to this embodiment, there is shown the front pumping arrangement where the pumping light source is connected to the prestage of the optical fiber. To the contrary, the present invention may be similarly applied to the rear pumping arrangement where the pumping light is inputted into the rear end of the optical fiber.

While the present invention has been described in detail, the amplified signal light having the wavelength of "λ1" and the light output having the wavelength "λ2" adjacent to the wavelength "λ1" are monitored by the light receiving devices provided at the output side of the rare earth doped optical fiber in accordance with the optical fiber amplifier having the light surge preventing function. Based upon the light intensity ratio of the light having the different wavelengths, the pumping light is controlled. As a consequence, since it is not required to additionally arrange the optical component at the prestage of the rare earth doped optical fiber, there is no risk to induce the loss of the input signal light. It is also possible to prevent the occurrence of light surge under no signal condition without increasing the noise figure.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical fiber amplifier having a light surge preventing function, comprising:

pumping light output means for outputting pumping light;

light multiplexing means for multiplexing said pumping light with signal light;

an optical fiber connected to said light multiplexing means, for amplifying said signal light to thereby output therefrom amplified signal light;

first branching means for deriving light having a first wavelength from said amplified signal light;

second branching means for deriving light having a second wavelength from said amplified signal light;

first light receiving means for receiving said light having the first wavelength to detect first light intensity thereof;

second light receiving means for receiving said light having the second wavelength to detect second light intensity thereof;

comparing means for comparing the first light intensity detected by said first light receiving means with the second light intensity detected by said second light receiving means to thereby output a ratio of said first and second light intensity; and pumping light control means for controlling said pumping light output means based upon said light intensity ratio.

2. An optical fiber amplifier having a light surge preventing function, comprising:

pumping light output means for outputting pumping light;

light multiplexing means for synthesizing said pumping light with signal light;

an optical fiber connected to said light multiplexing means, for amplifying said signal light to thereby output therefrom amplified signal;

a first light branching device for branching said amplified signal light into first branched/amplified signal light and second branched/amplified signal light;

a first light receiving device for receiving light having a first preselected wavelength of said second branched/amplified signal light to detect first light intensity;

a second light branching device for branching said second branched/amplified signal light to output third branched/amplified signal light and fourth branched/amplified signal light;

a second light receiving device for receiving light having a second preselected wavelength of said third branched/amplified signal light to detect second light intensity;

a comparator for comparing said first light intensity with said second light intensity to thereby output a ratio of said first and second light intensity; and a pumping light control circuit for controlling said pumping light in response to a difference between said first light intensity and said second light intensity.

3. An optical fiber amplifier having a light surge preventing function as claimed in claim 2 wherein:

said first wavelength does not contain a center wavelength of said amplified signal light.

4. An optical fiber amplifier having a light surge preventing function as claimed in claim 3 wherein:

said first wavelength contains a center wavelength of said amplified signal light.

5. An optical fiber amplifier having a light surge preventing function as claimed in claim 4, further comprising:

first wavelength selecting means arranged at a prestage of said first light receiving device, for selectively passing therethrough said light having the first wavelength.

6. An optical fiber amplifier having a light surge preventing function as claimed in claim 5 wherein:

said first wavelength selecting means comprises a light band-pass filter.

7. An optical fiber amplifier having a light surge preventing function as claimed in claim 5, further comprising:

second wavelength selecting means arranged at a prestage of said second light receiving device, for selectively passing therethrough said light having the second wavelength.

8. An optical fiber amplifier having a light surge preventing function as claimed in claim 7 wherein:

said second wavelength selecting means is arranged between said first light branching device and said second light branching device.

9. An optical fiber amplifier having a light surge preventing function as claimed in claim 7 wherein:

said second wavelength selecting means is arranged between said second light branching device and said second light receiving device.

10. An optical fiber amplifier having a light surge preventing function as claimed in claim 9 wherein:

said second wavelength selecting means comprises a light band-pass filter.

11. An optical fiber amplifier having a light surge preventing function as claimed in claim 4, further comprising:

a first light band-pass filter arranged between said first light branching device and said first light receiver, for selectively passing therethrough said light having the first wavelength; and a second light band-pass filter arranged between said second light branching device and said second light receiving device, for selectively passing therethrough said light having the second wavelength.

12. An optical fiber amplifier having a light surge preventing function as claimed in claim 11 wherein:

said optical fiber amplifier comprises:

pumping light control means for outputting said pumping light to said optical fiber when said light intensity ratio is larger than a preset reference value, and for interrupting the output of said pumping light to said optical fiber.

13. An optical fiber amplifier having a light surge preventing function as claimed in claim 12 wherein:

said pumping light control means includes:

pumping light output means for causing said pumping light source to output said pumping light when said light intensity ratio is higher than said reference value, and for causing said pumping light source to stop the output of said pumping light from said pumping light source when said light intensity ratio is lower than said reference value.

14. An optical fiber amplifier having a light surge preventing function as claimed in claim 13 wherein:

said pumping light source comprises a semiconductor laser diode; and said pumping light output means includes an injection current control circuit for supplying the injection current to said pumping light source when said light intensity ratio is higher than said reference value, and for interrupting the supply of said injection current into said pumping light source when said light intensity ratio is lower than said reference value.

15. An optical fiber amplifier having a light surge preventing function as claimed in claim 11 wherein:

said optical fiber includes a rare earth doped optical fiber into which a rare earth element is doped.

16. An optical fiber amplifier having a light surge preventing function as claimed in claim 15 wherein:

said rare earth element is erbium.

* * * * *